UNITED STATES PATENT OFFICE.

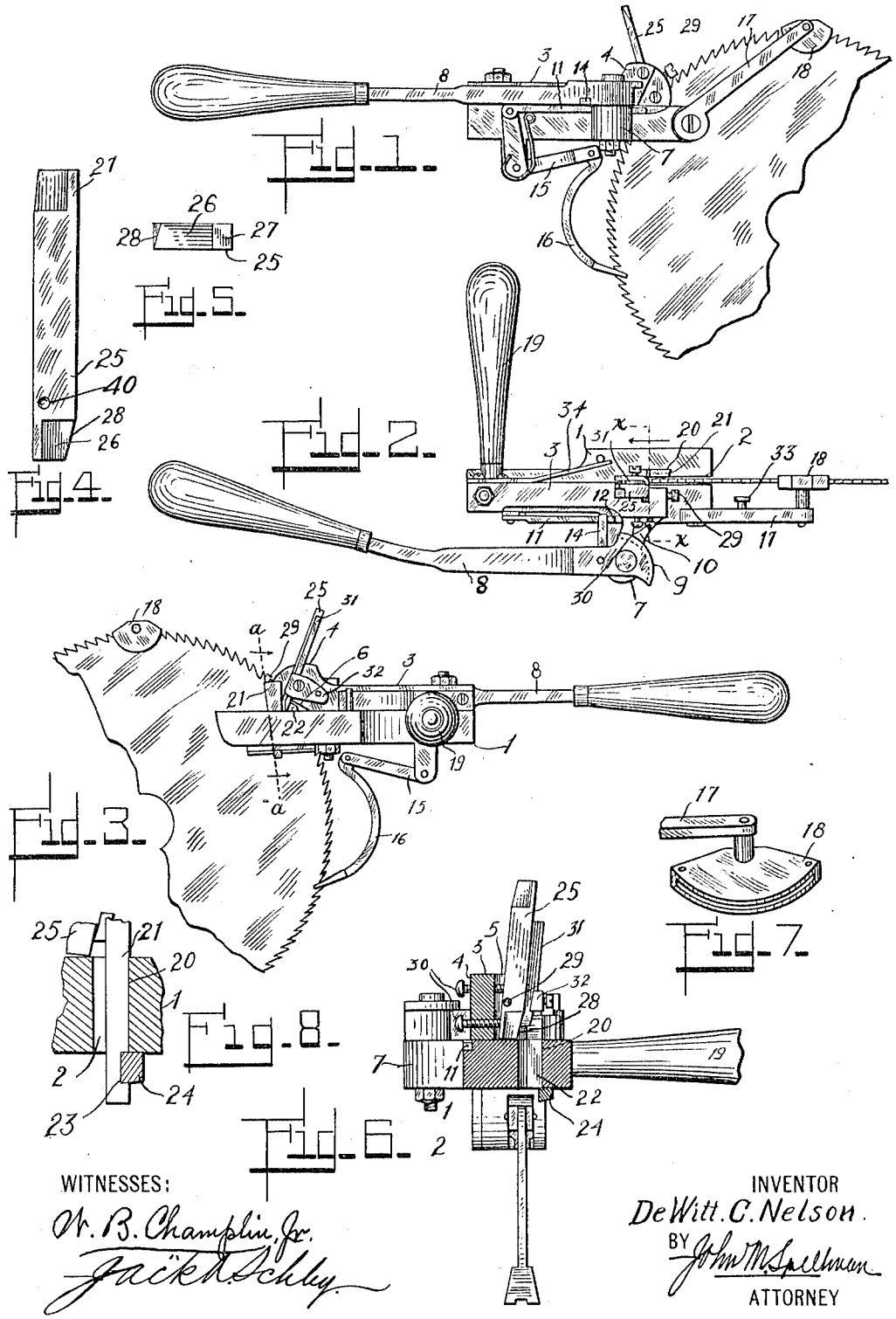

DE WITT C. NELSON, OF DALLAS, TEXAS, ASSIGNOR OF ONE-HALF TO JOHN H. NICHOLS, OF DALLAS, TEXAS.

COTTON-SAW GUMMER.

1,072,353.  Specification of Letters Patent.  Patented Sept. 2, 1913.

Application filed February 7, 1913. Serial No. 746,935.

*To all whom it may concern:*

Be it known that I, DE WITT C. NELSON, a citizen of the United States, residing at Dallas, in the county of Dallas and State of Texas, have invented certain new and useful Improvements in Cotton-Saw Gummers, of which the following is a specification.

This invention relates particularly to certain new and useful improvements in cotton saw gummers.

The object of the invention is to provide certain advantageous parts without changing the general construction and operation of the saw gummer now in common use. The parts involved are; an efficient fastening for the dies; a particular form of cutter whereby a cutting instead of a punching action will be had; means for adjusting the cutter to change the angle at which its cutting edge attacks the work; and an improved gage for regulating the depth of the cut.

A still further object of the invention is to provide a device of the character described that will be strong, durable, efficient, and simple and comparatively inexpensive to construct, also one in which the several parts will not be likely to get out of working order.

With the above and other objects in view the invention has relation to certain novel features of construction and operation, an example of which is described in the following specification and illustrated in the accompanying drawings, wherein:

Figure 1 is a side elevation of the gummer in position on a saw, Fig. 2 is a plan view of the same, Fig. 3 is a side elevation opposite to Fig. 1, Fig. 4 is an elevation of the cutter, Fig. 5 is a plan of the same, Fig. 6 is a transverse sectional view on the line $x$—$x$ of Fig. 2, Fig. 7 is a detail of the shoe, and Fig. 8 is a detail in cross section on the line $a$—$a$ of Fig. 3.

In the drawings the numeral 1 designates the base of the gummer, in the forward end of which is formed a slot 2 to receive the edge of the saw to be gummed. A bar 3 extending on the base has its rear end pivoted to the base. A head 4 is provided on the forward end of the bar and formed with a recess 5, and an under bevel portion 6 as shown in Fig. 3. The base 1 has a boss 7 at one side pivotally supporting a handle lever 8 having a cam head 9 which engages a cam lug 10 projecting from the adjacent side of the bar 3. In the base a pitman 11 is mounted to slide under the bar 3 and its lug. This pitman has an upstanding lug 12 in the path of a finger 14 projecting laterally from the lever 8. The pitman extends rearwardly along one side of the bar 3 and is pivoted to the upper end of a spring pressed bell-crank lever 15 supported by the base as shown in Fig. 1. The opposite end of the lever 15 pivotally supports a depending dog 16 having its lower end bifurcated and adapted to engage the teeth of a saw as shown. An arm 17 is pivoted to the forward end of the base 1 at one side and carries a shoe 18 at its free end adapted to engage over the teeth of the saw as shown. A handle 19 is secured to the rear end of the base. The parts described to this point are merely set forth as an explanation of the machine with which my invention is combined.

Heretofore the dies in this class of machines have given considerable trouble by constantly becoming loose and I propose to eliminate this trouble. Adjacent the head 4 of the bar 3 a recess 20 is offset from the slot 2 opposite the head 4 as shown in Figs. 2, 6 and 8. In this recess dies 21 and 22 are vertically disposed, the die 22 having its upper end projecting above the base 1 and inclined as shown in Fig. 3, the beveled portion 6 of the bar 3 swinging over said die. The other die 21 is wedge-shaped being inserted from the top of the base and projecting above and below the same as shown.

As best shown in Fig. 8, the die 21 has a specially shaped recess 23 in its outer face adapted to receive a wedge-key 24 which impinges the under face of the base 1 and frictionally fastens the die 21 in place, which latter holds the die 22 in position. The wedge-key provides a simple fastening readily adjusted and easily placed and removed.

Another feature of the invention resides in providing a cutter 25 carried by the head 4 and coöperating with the dies whereby a cutting action and not a punching action is had. The rear face of the cutter rests flat against the flat face of the wall of the head 4. Where the cutting side of the cutter is flat, said cutter will punch out metal, but not cut, and greater power is required for the punching. The cutter 25 is made reversible and is best shown in Figs. 4, 5 and 6. As both ends of the cutter are alike a description of one will suffice for both. The end of the cutter is beveled at 26 to a comparatively thin edge, the rib 27 being retained as a strengthening and reinforcing means. The cutting edge 28 is produced by beveling the side of the cutter in two directions at substantially right angles whereby said cutting edge is inclined inwardly in a downward direction and also rearward toward its center, reference being had to the lower end of the cutter Figs. 4 and 6.

When the cutter 25 is placed in the recess 5 of the head 4 as shown in Fig. 6 and the bar 3 swung to move the cutter across the saw standing in the slot 2, the upper portion of the inclined cutting edge 28 will first attack the saw, and as the movement is continued the cutting edge will gradually enter the saw and complete a cutting action of a shearing nature.

It is apparent that metals of different thickness and degree of hardness would require more or less power to be exerted on the cutter, but the more gradually the cutter entered the metal, less power proportionately would be required.

The cutter 25 is held in the recess 5 of the head 4 by a pivot screw 29 which has its end engaging in a shallow recess 40 in the face of the cutter and permitting the same to be swung laterally. Two screws 30 pass transversely through the head relatively above and below the pivot screw and impinge the side of the cutter as shown in Fig. 6. It is obvious that by adjusting these screws the cutter may be tilted or swung laterally or transversely of the head whereby the angle of inclination of the cutting edge 28 is adjusted.

It is apparent that the cutter 25 resting against the flat wall of the head 4 is held in contact therewith by the screw 29 which has its end engaged in the recess 40 of the cutter, and said cutter cannot be displaced laterally from its pivot position by the pressure of the screws 30.

At the shearing side of the cutter a gage 31 is supported in a keeper 32 adjustable on the side of the head 4. As shown particularly in Fig. 3, the gage is not as thick as the cutter and has its lower end beveled and shaped to conform to the cutter. When the gummer is on the saw the gage rests in the "crotch" between adjacent teeth and the distance between the lower end of the gage and the lower edge of the cutter, governs the depth of the cut. By adjusting the gage this distance is varied and the depth of the cut controlled.

In operating the gummer the base 1 is positioned so that the saw is received in the slot 2. The shoe 18 is engaged over the teeth as shown and suitable connection made between a weight on the floor (not shown) and a button 33 on the arm 17, whereby the gummer is held against the action of its feed.

The operator grasps the handle 19 and the handle-lever 8 and by swinging the latter outward causes the bar 3 to swing the cutter 25 across the saw thus sharpening or recutting the tooth. The lever is swung back and a spring 34 serves to return the bar to its normal position. As the lever is swung back the finger 14 engages the lug 12 and drives the pitman 11 forward whereby the bell-crank lever 15 is swung and through the agency of the dog 16 steps the saw a distance of one tooth, thus bringing the next tooth to be cut, into position in the slot 2.

What I claim, is:

1. The combination in a saw gummer, of a base having a saw receiving slot at one end, a bar arranged to swing on the base transversely of the saw receiving slot, a cutter carried by the bar in proximitiy to the slot and presenting an inclined cutting edge, said cutter being pivotally sustained, adjusting devices engaging the cutter relatively above and below its pivot point, and an operating member mounted on the base and engaging the bar.

2. The combination with a circular saw, of a saw gummer comprising, a base having a slot receiving the saw, a cutter support arranged on the base to swing transversely of the slot, a cutter carried by the support presenting a cutting edge inclined to the vertical plane of the saw, and means for varying the angle of inclination of the cutting edge of the cutter.

In testimony whereof I have signed my name to this specification in the presence of two subscribing witnesses.

DE WITT C. NELSON.

Witnesses:
 D. B. CARR,
 J. S. MURRAY.

---

Copies of this patent may be obtained for five cents each, by addressing the "Commissioner of Patents, Washington, D. C."